United States Patent
Liu et al.

(10) Patent No.: US 9,384,534 B2
(45) Date of Patent: Jul. 5, 2016

(54) METHOD AND SYSTEM FOR ESTABLISHING MODEL BASED ON VIRTUAL ALGORITHM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Peng Liu, Beijing (CN); Xue Dong, Beijing (CN); Kai Yang, Beijing (CN); Renwei Guo, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/518,182

(22) Filed: Oct. 20, 2014

(65) Prior Publication Data

US 2016/0055626 A1  Feb. 25, 2016

(30) Foreign Application Priority Data

Aug. 20, 2014  (CN) .......................... 2014 1 0413271

(51) Int. Cl.
  *G06K 9/00* (2006.01)
  *G06T 5/00* (2006.01)
  *G06T 3/40* (2006.01)
  *H04N 1/58* (2006.01)
(52) U.S. Cl.
  CPC .................. *G06T 5/003* (2013.01); *G06T 3/403* (2013.01); *H04N 1/58* (2013.01)
(58) Field of Classification Search
  None
  See application file for complete search history.

(56) References Cited

U.S. PATENT DOCUMENTS

| | | | | |
|---|---|---|---|---|
| 7,123,277 B2* | 10/2006 | Brown Elliott | ........ | G06T 3/4015 345/426 |
| 7,492,379 B2* | 2/2009 | Credelle | ........... | G02F 1/133514 345/204 |
| 7,525,526 B2* | 4/2009 | Brown Elliott | ........ | G06T 3/4007 345/100 |
| 2008/0049048 A1* | 2/2008 | Credelle | .............. | G09G 3/2074 345/690 |
| 2008/0170083 A1* | 7/2008 | Han | ........................ | G09G 5/377 345/589 |
| 2008/0186325 A1* | 8/2008 | Higgins | ................ | G06T 11/001 345/592 |
| 2010/0045695 A1* | 2/2010 | Brown Elliott | ....... | G09G 3/2003 345/589 |
| 2010/0118045 A1* | 5/2010 | Brown Elliott | .... | G02B 27/2214 345/589 |
| 2010/0149204 A1* | 6/2010 | Han | ........................ | G09G 5/02 345/589 |
| 2012/0032947 A1* | 2/2012 | Phan | ..................... | G09G 3/003 345/419 |
| 2013/0113794 A1* | 5/2013 | Ishibashi | ............... | G06T 15/503 345/419 |
| 2014/0225940 A1* | 8/2014 | Nakagawa | ........... | G09G 3/3607 345/690 |
| 2015/0294628 A1* | 10/2015 | Nakagawa | ........... | G09G 3/3607 345/694 |

OTHER PUBLICATIONS

Elliott, C. H., et al. "Development of the PenTile Matrix™ color AMLCD subpixel architecture and rendering algorithms." Journal of the Society for Information Display 11.1 (2003): 89-98.*

* cited by examiner

*Primary Examiner* — Li Liu
(74) *Attorney, Agent, or Firm* — Collard & Roe, P.C.

(57) ABSTRACT

The present disclosure provides an image processing method based on a virtual algorithm, comprising: a) simulating a single subpixel; b) simulating a subpixel array of a single color; c) overlaying subpixel arrays of different colors; and d) deriving a virtual signal.

9 Claims, 7 Drawing Sheets

METHOD AND SYSTEM FOR ESTABLISHING MODEL BASED ON VIRTUAL ALGORITHM

CROSS REFERENCE TO RELATED APPLICATIONS

This application claims priority under 35 U.S.C §119 of Chinese Application No. 201410413271.X filed on Aug. 20, 2014, the disclosure of which is incorporated by reference.

TECHNICAL FIELD

The present invention relates to the display field, and more particularly to a method and system for establishing a model based on a virtual algorithm.

BACKGROUND

A virtual algorithm can fully utilize the characteristics of human eyes for spatial resolution to achieve a relatively high virtual resolution with respect to a specific subpixel arrangement under a relatively low physical resolution, by way of subpixel share, etc. It has such advantages as low power consumption, low process difficulty and high resolution, etc.

The core concept of the virtual algorithm is subpixel share. If a pixel position is lack of a subpixel of corresponding color, the way of subpixel share needs to be used to derive virtually the color that the position is lack of. If each derived virtual pixel can restore the input signal accurately, it indicates that this share algorithm can achieve a relatively high virtual resolution by using a relatively low physical resolution.

Some virtual algorithms also have disadvantages, for example, there will emerge colorful sides at image edges (color aliasing effect), and/or there will emerge sawtooth shapes, etc. at slash borders. Therefore it needs to continuously optimize and adjust these algorithms. In order to judge the merits of the algorithm, it needs to establish a set of stable evaluation system. A common practice is to calculate the RMS of the difference between corresponding pixels (as shown in the following formula). The smaller the RMS is, the smaller the difference between the output signal and the input signal is, and the higher the degree of reduction of the algorithm for the original picture is.

$$\frac{1}{N}\sum_{All} \sqrt{(R_{out} - R_{in})^2 + (G_{out} - G_{in})^2 + (B_{out} - B_{in})^2}$$

$R_{out}$, $G_{out}$ and $B_{out}$ represent the strengths of red, green and blue pixels of the output signal, respectively, and $R_{in}$, $G_{in}$ and $B_{in}$ represent the strengths of red, green and blue pixels of the input signal, respectively.

In the present design, the practical pixel arrangement and the input pixels are not in a one-to-one correspondence relation. Therefore, it needs to convert the practical pixel arrangement into virtual pixels, so as to be able to appraise the algorithm by RMS. The present design is to simulate how a practical pixel is converted into a virtual pixel based on a model established based on the subjective feelings of the human eye.

SUMMARY

Additional aspects and advantages of the present invention will be set forth in the description which follows, and in part will be apparent from the description, or may be learned by practice of the invention.

The present design is a model design based on a virtual algorithm.

The virtual algorithm processes an input signal by using a filter, can raise a relatively low physical resolution to a relatively high virtual resolution, and for different image types, shall adopt different filters as appropriate. The present design adopts that a sharpen border in an image is distinguished based on brightness borer decision, thereby processing the image by using different filters.

The virtual algorithm is a new type of image processing mode. With respect to a specific subpixel arrangement mode, the virtual algorithm can raise a relatively low physical resolution to a relatively high virtual resolution, optimize display effect and enhance the feelings of the human eye.

In order to judge the merits of the virtual algorithm, it needs to establish a set of evaluation standards. A common evaluation standard is to compare an input signal with an output signal, calculate the mean squared error of corresponding pixels. The smaller the mean squared error is, the higher it indicates the degree of reduction of the virtual algorithm for the original data is, and the better it indicates the virtual effect is.

In the pixel arrangement of the present design, practical pixels and traditional pixels are not in a one-to-one correspondence relation. Therefore, it needs to establish a human eye model to simulate the RGB value of the practical pixel at the position of the virtual pixel, and thus establish a correspondence relation between the traditional pixel and the virtual pixel. After the correspondence relation is established, the mean squared error between the traditional pixel and the virtual pixel can be calculated, to establish an algorithm evaluation standard.

The model established by the present design can be used to calculate the mean squared error between input data and output data and evaluate merits of the algorithm.

The present design simulates strength distribution of a single subpixel by establishing a lattice composed of a bivariate normal distribution.

The present design adjusts a dispersity of a single subpixel by adjusting a parameter $\sigma^2$ of a bivariate normal distribution.

The present design calculates a weight in a corresponding grid area by obtaining integral value of a single subpixel in different grid areas.

The present design simulates a strength distribution of a subpixel array by overlaying different subpixels at a same position.

The present design calculates the value of $\sigma^2$ under an optimum case through a limiting condition of a subpixel array.

The present design simulates subpixel arrays of different colors to obtain a final human eye model.

The human eye model of the present design should fit the subjective feeling of the human eye, and is adjusted and optimized continuously along with the actual situation.

The present disclosure provides an image processing method based on a virtual algorithm, comprising: a) simulating a single subpixel of a practical pixel through a lattice composed of a bivariate normal distribution to obtain a simulation result of the single subpixel including normal distribution parameters; b) establishing a subpixel array of a single color, which contains a repeating group composed of a left side practical pixel and a right side practical pixel, dividing a whole plane into a grid area in which each square in the grid area corresponds to a practical pixel by using the subpixels of the single color as an origin, and selecting the normal distribution parameters through a limiting condition of the subpixel array of the single color; c) calculating integral values of the subpixels of the single color in different squares according to the selected normal distribution parameters to obtain different weight coefficients of the subpixels of the single color at different squares, stacking the subpixels of the single color in different squares, having an effect on the practical pixel, according to different weight coefficients to obtain the strength of the single color of the left side practical pixel and the strength of the single color of the right side practical pixel in the subpixel array of the single color; and d) placing the strengths of three colors of the left side practical pixel into a pixel to obtain the left side virtual pixel corresponding to the position of the left side practical pixel, and placing the strengths of three colors of the right side practical pixel into a pixel to obtain right side virtual pixel corresponding to the position of the right side practical pixel; wherein, the aspect ratio of the single subpixel of the practical pixel is 2:3, and three subpixels constitute two practical pixels.

The present disclosure provides an image processing system based on a virtual algorithm, comprising: one or more processors configured to: simulate a single subpixel of a practical pixel through a lattice composed of a bivariate normal distribution to obtain a simulation result of the single subpixel including normal distribution parameters; establish a subpixel array of a single color, which contains a repeating group composed of a left side practical pixel and a right side practical pixel, divide a whole plane into a grid area in which each square in the grid area corresponds to a practical pixel by using the subpixels of the single color as an origin, and select the normal distribution parameters through a limiting condition of the subpixel array of the single color; calculate integral values of the subpixels of the single color in different squares according to the selected normal distribution parameters to obtain different weight coefficients of the subpixels of the single color at different squares, stack the subpixels of the single color in different squares, having an effect on the practical pixel, according to different weight coefficients to obtain the strength of the single color of the left side practical pixel and the strength of the single color of the right side practical pixel in the subpixel array of the single color; and place the strengths of three colors of the left side practical pixel into a pixel to obtain the left side virtual pixel corresponding to the position of the left side practical pixel, and place the strengths of three colors of the right side practical pixel into a pixel to obtain right side virtual pixel corresponding to the position of the right side practical pixel; wherein, the aspect ratio of the single subpixel of the practical pixel is 2:3, and three subpixels constitute two practical pixels.

BRIEF DESCRIPTION OF THE DRAWINGS

The preferred embodiments of the present invention will be detailed in conjunction with drawings. The above and other objects, characteristics and advantages of the present invention will become more apparent. In the drawings, same numbers designate units having same structures, and wherein:

FIG. 9 shows a red subpixel array when taking a red subpixel as an example.

FIG. 13 provides simulating blue subpixel array according to an embodiment of the present invention.

FIG. 14 provides simulating green subpixel array according to an embodiment of the present invention.

DETAILED DESCRIPTION

The present invention will be described fully below with reference to drawings showing embodiments of the present invention. However, the present invention can be implemented in many different forms, and should not be considered as limiting to the embodiments described herein. Instead, these embodiments are provided to make the present disclosure thorough and complete, and express fully the scope of the present invention to those skilled in the art. In the drawings, the components are exaggerated for clarity.

Unless otherwise defined, all terms (including technical and scientific terms) used herein have the same meanings as what those ordinary skilled in the art the present invention belongs to commonly understand. It should be further appreciated that the terms such as those defined in usual dictionaries should be construed as having meanings consistent with their meanings in the context of related art, and should not be construed in an ideal or extremely formalized sense, unless so defined expressly herein.

The present design simulates a single subpixel through a lattice composed of a bivariate normal distribution.

Through a limiting condition of a subpixel array, a normal distribution parameter $\sigma^2$ is determined.

Integration is conducted in different square areas to derive weight coefficients of a subpixel at different spatial positions.

According to the selected parameter $\sigma^2$, eye models corresponding to RGB subpixel arrays are established, respectively.

Figure 1:
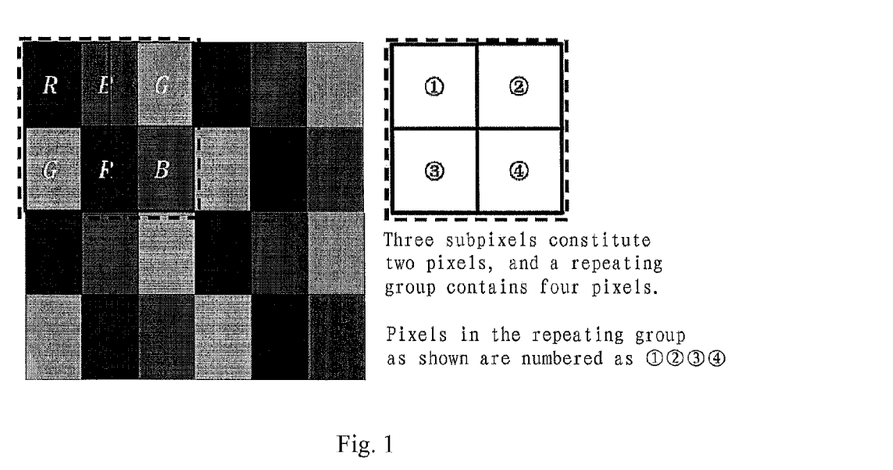
FIG. 1 provides a new type of subpixel arrangement mode according to an embodiment of the present invention.

FIG. 1 provides a new type of subpixel arrangement mode according to an embodiment of the present invention. This kind of subpixel arrangement mode can fully utilize a spatial arrangement of the three colors of red, blue and green, facilitating implementation of higher virtual resolution.

Therein, the aspect ratio of each of the red, blue and green subpixels is 2:3, so three subpixels RBG constitute two pixels. A repeating group contains four pixels as shown in numbers ①②③④ in the figure.

Figure 2:
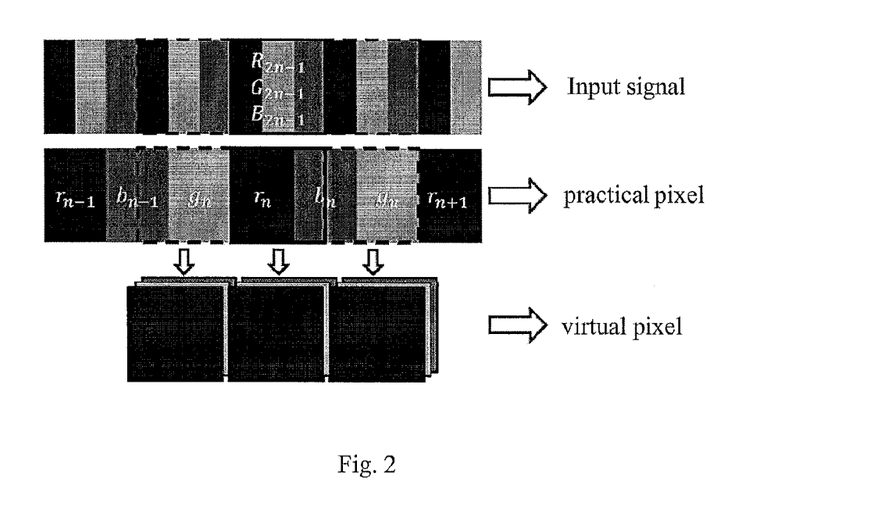
FIG. 2 provides a correspondence relation between an input signal, a practical pixel and a virtual pixel.

FIG. 2 provides a correspondence relation between an input signal, a practical pixel and a virtual pixel.

The input signal is a traditional RGB signal, as shown in the first line, where the aspect ratio of each of the red, blue and green subpixels is 1:3, so three subpixels RBG constitute one pixel.

The practical pixel and the new type of subpixel arrangement mode shown in FIG. 1 are identical, as shown in the second line. Since each practical pixel does not have real RGB subpixels, for example, the pixels enclosed by a solid line in the second line only contain RB subpixels and do not contain G subpixel. Therefore, in order to show input RGB signals, it needs to utilize surrounding subpixels to commonly constitute virtual pixel containing such three components as RGB, for example, as shown in the third line.

How practical pixels are converted into virtual pixels will be described in conjunction with FIGS. 3-14 below.

Figure 3:
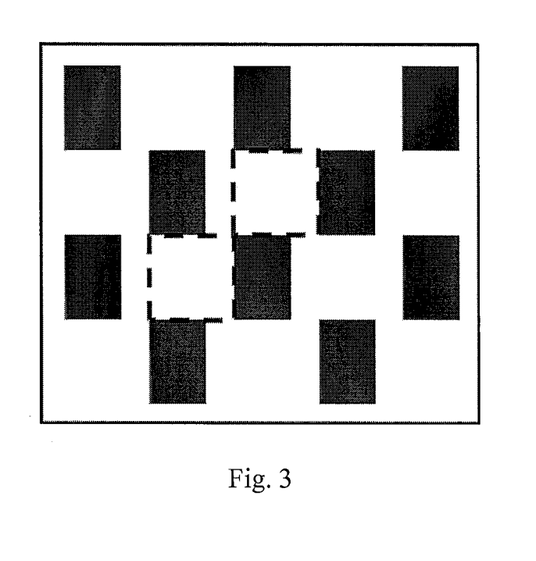
FIG. 3 shows red subpixels in practical pixels according to an embodiment of the present invention.

FIG. 3 shows red subpixels in practical pixels according to an embodiment of the present invention.

For convenience of description, FIG. 3 only shows three practical pixel positions by using dotting boxes. As shown in FIG. 3, taking an array composed of red subpixels as an example, each shown dotted box is a practical pixel position, and is also the position of the corresponding input RGB signal. As shown in FIG. 3, two practical pixel positions in the three practical pixel positions shown with the dotted boxes in the figure do not have red subpixels. In order to achieve RGB display, it needs to calculate how many the red components of the two corresponding positions are. The model established by the present design is used to simulate how many each component such as the red component at each practical pixel position "looks like".

Figure 4:
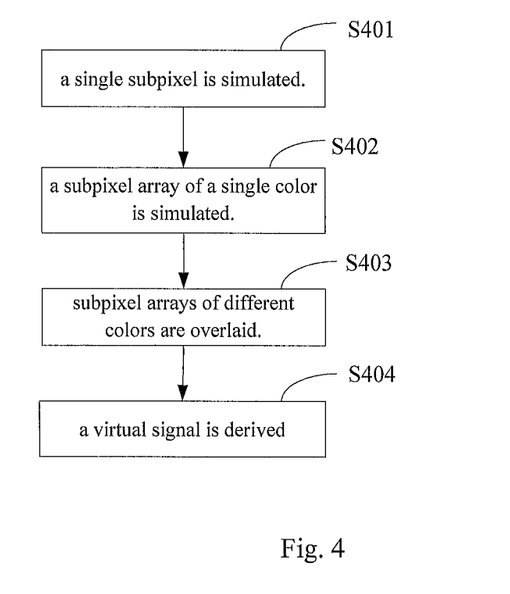
FIG. 4 provides a flow of a image processing method based on a virtual algorithm according to an embodiment of the present invention.

FIG. 4 provides a flow of a image processing method based on a virtual algorithm according to an embodiment of the present invention.

As shown in FIG. 4, at step S401, a single subpixel is simulated.

At step S402, a subpixel array of a single color is simulated.

At step S403, subpixel arrays of different colors are overlaid.

At step S404, a virtual signal is finally derived.

Figure 5:
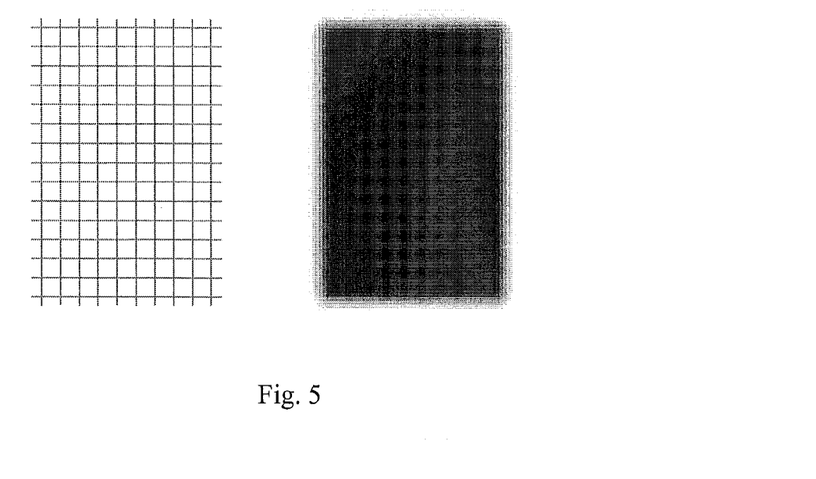
FIG. 5 shows a simulation for a single subpixel according to an embodiment of the present invention.

FIG. 5 shows a simulation for a single subpixel according to an embodiment of the present invention.

As shown in the left part of FIG. 5, a single subpixel of a practical pixel is divided into 10×15 squares (since the aspect ratio of the subpixel of the practical pixel is 2:3). Each square uses a bivariate independent normal distribution shown in formula 1 to simulate its strength value.

$$f(x, y) = \frac{1}{2\pi\sigma_1\sigma_2} e^{-\frac{1}{2}\left[\frac{(x-\mu_1)^2}{\sigma_1^2} + \frac{(x-\mu_2)^2}{\sigma_2^2}\right]} \quad (1)$$

Therein, $\mu_1$, $\mu_2$, $\sigma_1$ and $\sigma_2$ are the expectation values and standard deviations of x and y, respectively.

All points in a subpixel range are overlaid so as to obtain the simulated result of the subpixel, as shown in the right part of FIG. 5.

Degree of dispersion is a parameter representing the speed at which the strength of a subpixel model becomes smaller from the middle toward the distance. By adjusting $\sigma^2$ in formula (1), the degree of dispersion of the subpixel model can be adjusted.

Figure 6:
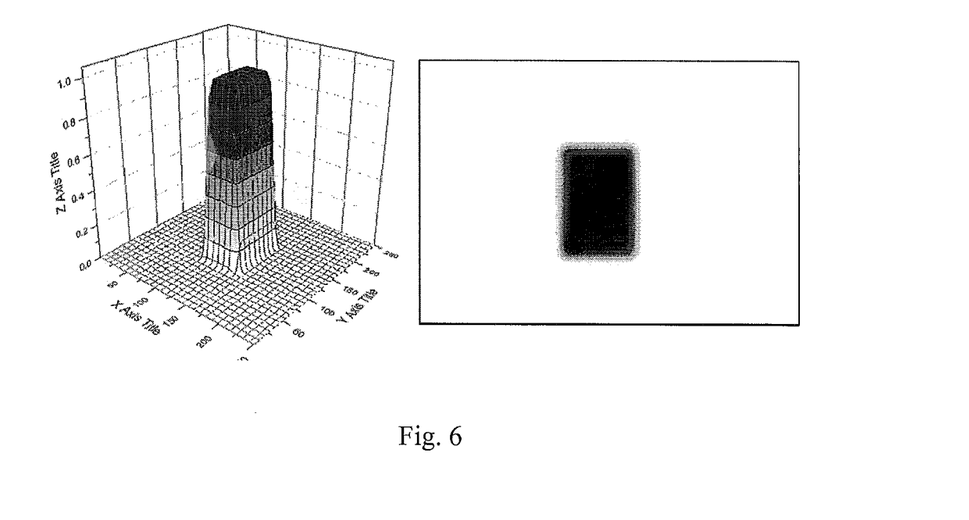
FIGS. 6-8 show simulation results of subpixels when $\sigma_1$ and $\sigma_2$ have different values, respectively.
Figure 7:
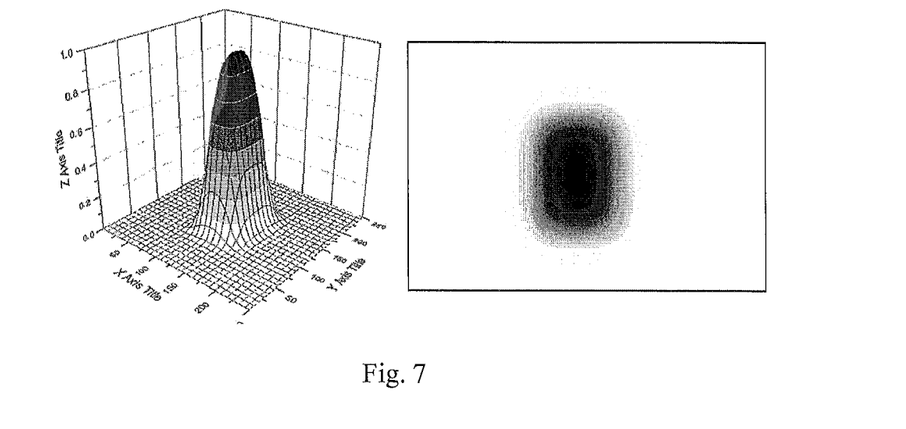
Figure 8:
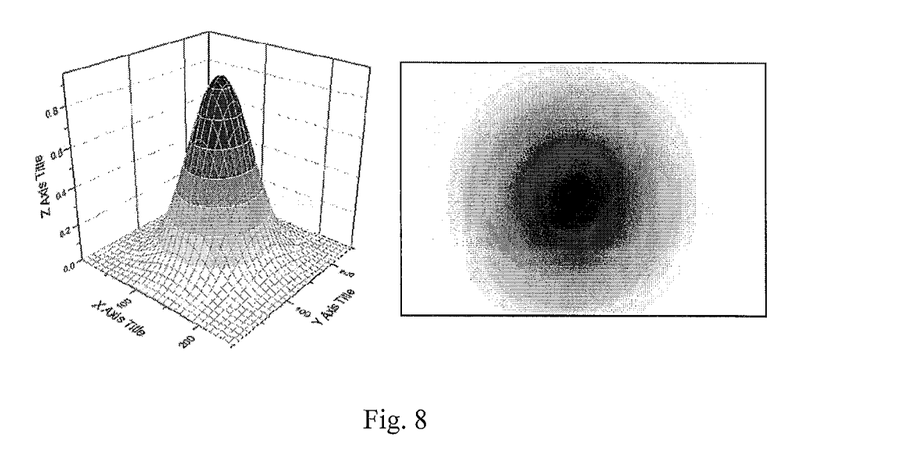

FIGS. 6-8 show simulation results of subpixels when $\sigma_1$ and $\sigma_2$ have different values.

As shown in FIG. 6, there is shown the degree of dispersion of the subpixel when $\sigma_1=\sigma_2=0.5$.

As shown in FIG. 7, there is shown the degree of dispersion of the subpixel when $\sigma_1=\sigma_2=5$.

As shown in FIG. 8, there is shown the degree of dispersion of the subpixel when $\sigma_1=\sigma_2=50$.

It can be seen that, the greater $\sigma^2$ is, the greater the degree of dispersion of the subpixel model is, and the slower the varying speed of the strength of the practical pixel is; and the smaller the degree of dispersion is, the faster the varying speed of the strength of the practical pixel is. We need to select a suitable $\sigma^2$ according to practical needs.

Simulating subpixel array will be described below with reference to FIG. 9 to FIG. 12 by taking the red subpixel as an example.

FIG. 9 shows a red subpixel array when taking a red subpixel as an example.

Figure 9A:
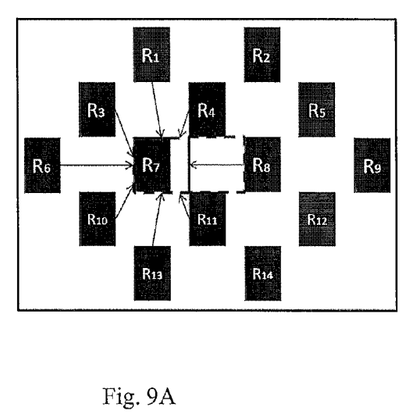
FIG. 9A shows all red subpixels in the array.

FIG. 9A shows all red subpixels in the array.

In the red subpixel array of FIG. 9A, there is shown a repeating group composed of two practical pixels (called "left side practical pixel" and "right side practical pixel"), i.e., those as shown in two dotted boxes in the figure. The strength distribution of a whole display screen can be obtained by obtaining red strengths of the two positions. For the left side practical pixel, as shown in 9A, red subpixels $R_1$, $R_3$, $R_4$, $R_6$, $R_7$, $R_8$, $R_{10}$, $R_{11}$ and $R_{13}$ will influence a red strength value of the left side practical pixel.

Figure 9B:
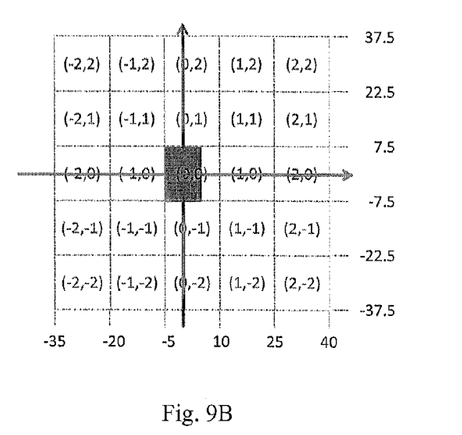
FIG. 9B shows a practical pixel array taking a left side practical pixel as an origin.

FIG. 9B shows a practical pixel array taking a left side practical pixel as an origin.

As shown in FIG. 9B, by taking a single subpixel model as an origin, a whole plane is divided into square areas (what each square is corresponding to is a practical pixel), and a second integral of a single subpixel in different squares is calculated so as to determine the red strength value of the single subpixel.

Figure 10A:
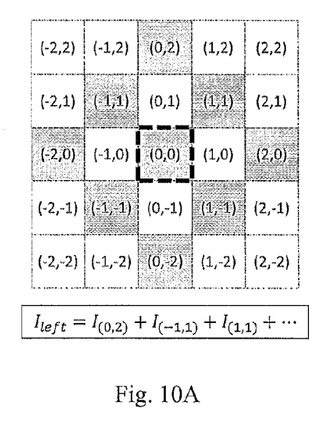
FIG. 10A and FIG. 10B provide that a limiting condition of $\sigma^2$ is determined by taking a red subpixel as an example according to an embodiment of the present invention.
Figure 10B:
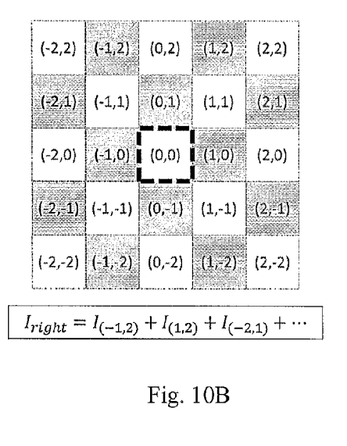

FIG. 10A and FIG. 10B provide that a limiting condition of $\sigma^2$ is determined by taking a red subpixel as an example according to an embodiment of the present invention.

The shadow squares in FIG. 10A are subpixels having influence on the left side practical pixel in FIG. 9A, and the shadow squares in FIG. 10B are subpixels having influence on the right side practical pixel in FIG. 9A. When determining $\sigma^2$, it is assumed to be conducted under the condition that the red subpixels are all bright, and the strength values of the left practical pixel and the right practical pixel are as follows:

$I_{left}=I_{(0,2)}+I_{(-1,1)}+I_{(1,1)}+I_{(-2,0)}+I_{(0,0)}+I_{(2,0)}+I_{(-1,-1)}+I_{(1,-1)}+I_{(0,-2)}$ $I_{right}=I_{(-1,2)}+I_{(1,2)}+I_{(-2,1)}+I_{(0,1)}+I_{(2,1)}+I_{(-1,0)}+I_{(1,0)}+I_{(-2,-1)}+I_{(0,-1)}+I_{(2,-1)}+I_{(-1,-2)}+I_{(1,-2)}$ Wherein, $I_{(0,2)}$, $I_{(-1,1)}$, $I_{(1,1)}$, etc. are weight coefficients indicating influences of corresponding squares on the left side or right side practical pixel. Because it is assumed that the red subpixels are all bright, the red strength value of each square is all 255, and will be omitted in the above formulae.

Because the subjective feeling of human eyes looking at a display screen is a plane having uniformly distributed strengths, the strengths of the left side practical pixel and the right side practical pixel should be approximately equal. So a limiting condition is:

$I_{left}=I_{right}$.

Figure 11:
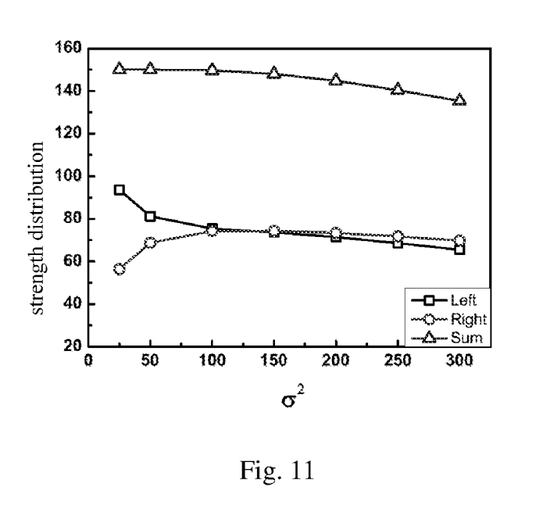
FIG. 11 shows a curve graph of a relation between $\sigma^2$ and the strengths of both a left side practical pixel and a right side practical pixel according to an embodiment of the present invention.

FIG. 11 shows a curve graph of a relation between $\sigma^2$ and the strengths of both a left side practical pixel and a right side practical pixel according to an embodiment of the present invention.

As shown in FIG. 11, with respect to $\sigma^2$ having a value of 25, 50, 100, 150, 200, 250 or 300, corresponding $I_{left}$ and $I_{right}$ are calculated, respectively. Those strength values marked with square points are values of $I_{left}$ when $\sigma^2$ has a value of 25, 50, 100, 150, 200, 250 or 300; those strength values marked with circular points are values of $I_{right}$ when $\sigma^2$ has a value of 25, 50, 100, 150, 200, 250 or 300; and those strength values marked with triangular points are values of the sum of Left and $I_{right}$ when $\sigma^2$ has a value of 25, 50, 100, 150, 200, 250 or 300.

It can be seen from FIG. 11 that, when $\sigma^2$ is 100, the strengths of the left side practical pixel and the right side practical pixel are approximately equal, and so $\sigma^2=100$ is selected according to a limiting condition of $I_{left}=I_{right}$.

Figure 12A:
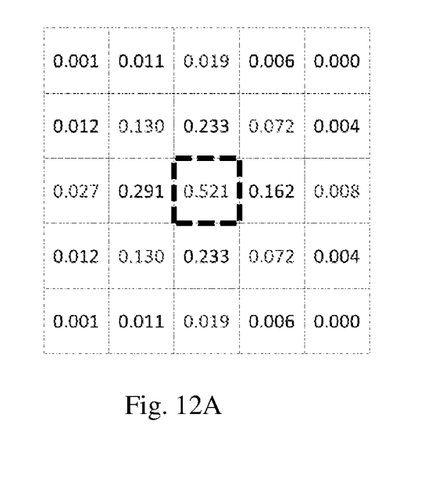
FIG. 12A provides integral values, i.e. weight coefficients, of each square obtained according to a selected parameter $\sigma^2$ by taking the left side practical pixel in FIG. 9A as an origin.
Figure 12B:
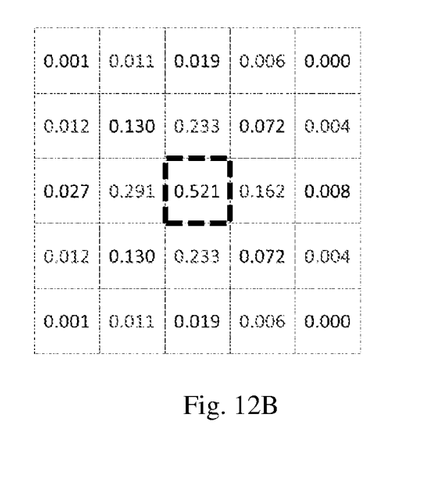
FIG. 12B provides integral values, i.e. weight coefficients, of each square when $\sigma^2=100$ by taking the right side practical pixel in FIG. 9A as an origin.

FIG. 12A provides integral values, i.e. weight coefficients, of each square obtained according to a selected parameter $\sigma^2$ by taking the left side practical pixel in FIG. 9A as an origin; and FIG. 12B provides integral values, i.e. weight coefficients, of each square when $\sigma^2=100$ by taking the right side practical pixel in FIG. 9A as an origin.

The subpixel array in FIG. 9 and the weight coefficients in FIG. 12 are of a centrosymmetric relation.

Integral values of every square having effect on the practical pixels are overlaid to derive the strengths of the left and right practical pixels, i.e.:

$$R_{left} = 0.019R_1 + 0.072R_3 + 0.130R_4 + 0.008R_6 +$$
$$0.521R_7 + 0.027R_8 + 0.072R_{10} + 0.130R_{11} + 0.019R_{13};$$
$$R_{right} = 0.006R_1 + 0.011R_2 + 0.004R_3 + 0.233R_4 + 0.012R_5 + 0.162R_7 +$$
$$0.291R_8 + 0.004R_{10} + 0.233R_{11} + 0.012R_{12} + 0.006R_{13} + 0.011R_{14}.$$

FIG. 13 provides simulating blue subpixel array according to an embodiment of the present invention.

Figure 13A:
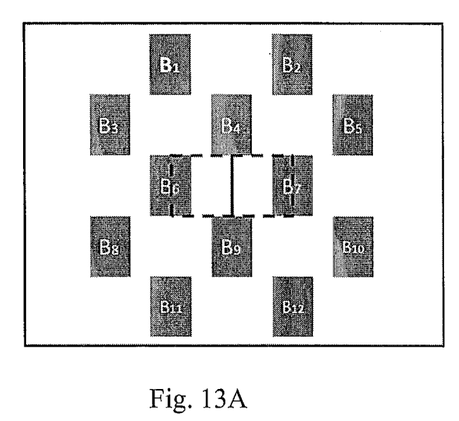
FIG. 13A shows all blue subpixels in the array.

FIG. 13A shows all blue subpixels in the array.

In the blue subpixel array of FIG. 13A, there are shown a repeating group composed of two practical pixels (called "left side practical pixel" and "right side practical pixel"), i.e., those as shown by two dotted boxes in the figure.

Figure 13B:
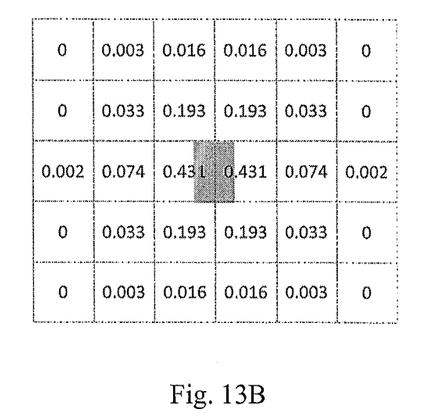
FIG. 13B shows integral values of each square when $\sigma^2=100$.

FIG. 13B shows integral values of each square when $\sigma^2=100$.

Likewise, integral values of every square are overlaid to derive the strengths of the left and right practical pixels in the blue subpixel array, i.e.:

$$B_{left} = 0.016B_1 + 0.003B_2 + 0.033B_3 + 0.193B_4 + 0.431B_6 +$$
$$0.074B_7 + 0.033B_8 + 0.193B_9 + 0.016B_{11} + 0.003B_{12};$$
$$B_{right} = 0.006B_1 + 0.011B_2 + 0.233B_4 + 0.012B_5 + 0.004B_6 +$$
$$0.162B_7 + 0.291B_9 + 0.004B_{10} + 0.233B_{11} + 0.012B_{12}.$$

FIG. 14 provides simulating green subpixel array according to an embodiment of the present invention.

Figure 14A:
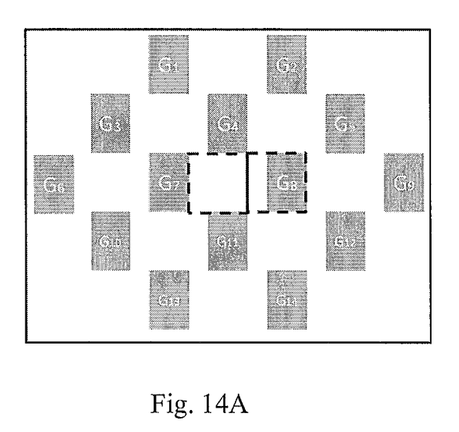
FIG. 14A shows all green subpixels in the array.

FIG. 14A shows all green subpixels in the array.

In the green subpixel array of FIG. 14A, there are shown a repeating group composed of two practical pixels (called "left side practical pixel" and "right side practical pixel"), i.e., those as shown by two dotted boxes in the figure.

Figure 14B:
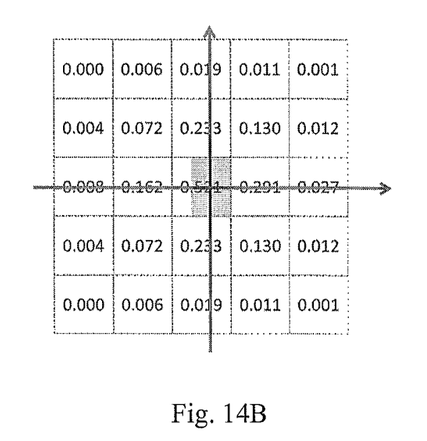
FIG. 14B shows integral values of each square when $\sigma^2=100$.

FIG. 14B shows integral values of each square when $\sigma^2=100$.

Likewise, integral values of every square are overlaid to derive the strengths of the left and right practical pixels in the green subpixel array, i.e.:

$$G_{left} = 0.011G_1 + 0.006G_2 + 0.012G_3 + 0.233G_4 + 0.004G_5 + 0.291G_7 +$$
$$0.162G_8 + 0.012G_{10} + 0.233G_{11} + 0.004G_{12} + 0.011G_{13} + 0.006G_{14};$$
$$G_{right} = 0.019G_2 + 0.130G_4 + 0.072G_5 + 0.027G_7 +$$
$$0.521G_8 + 0.008G_9 + 0.130G_{11} + 0.072G_{12} + 0.019G_{14}.$$

The RGB components are overlaid.

That is, $R_{left}$, $B_{left}$, $G_{left}$ previously obtained according to different weights are placed into a pixel to obtain the left side virtual pixel.

$R_{right}$, $B_{right}$, $G_{right}$ previously obtained according to different weights are placed into a pixel to obtain the right side virtual pixel.

Thus a human eye model is obtained. The human eye model should fit actual situations as far as possible, and is corrected at any time.

The above is the description for the present invention, and should not be considered as a limitation thereto. Although several exemplary embodiments of the present invention are described, those skilled in the art will readily understand, without departing from the novel teaching and advantages of the present invention, many modifications can be made to the exemplary embodiments. Accordingly, all such modifications are intended to be included within the scope of the present invention defined by the claims. It should be understood that the above is the description for the present invention, and should not be considered limited to the disclosed particular embodiments, and modifications to the disclosed embodiments and other embodiments are intended to be included within the scope of the appended claims. The present invention is defined by the appended claims and their equivalents.

The invention claimed is:

1. An image processing method based on a virtual algorithm, comprising:
   a) simulating a single subpixel of a practical pixel through a lattice composed of a bivariate normal distribution to obtain a simulation result of the single subpixel including normal distribution parameters;
   b) establishing a subpixel array of a single color, which contains a repeating group composed of a left side practical pixel and a right side practical pixel, dividing a whole plane into a grid area in which each square in the grid area corresponds to a practical pixel by using the subpixels of the single color as an origin, and selecting the normal distribution parameters through a limiting condition of the subpixel array of the single color;
   c) calculating integral values of the subpixels of the single color in different squares according to the selected normal distribution parameters to obtain different weight coefficients of the subpixels of the single color at different squares, stacking the subpixels of the single color in different squares, having an effect on the practical pixel, according to different weight coefficients to obtain the strength of the single color of the left side practical pixel and the strength of the single color of the right side practical pixel in the subpixel array of the single color; and
   d) placing the strengths of three colors of the left side practical pixel into a pixel to obtain the left side virtual pixel corresponding to the position of the left side practical pixel, and placing the strengths of three colors of the right side practical pixel into a pixel to obtain right side virtual pixel corresponding to the position of the right side practical pixel;

wherein, the aspect ratio of the single subpixel of the practical pixel is 2:3, and three subpixels constitute two practical pixels.

2. The image processing method according to claim 1, wherein step a) further comprises:
  dividing the single subpixel into a two-dimensional spatial grid which comprises m×n squares;
  simulating each square by using a bivariate normal distribution shown as follows;

$$f(x, y) = \frac{1}{2\pi\sigma_1\sigma_2} e^{-\frac{1}{2}\left[\frac{(x-\mu_1)^2}{\sigma_1^2} + \frac{(x-\mu_2)^2}{\sigma_2^2}\right]};$$

and
  stacking all squares within the range of the single subpixel to obtain the simulation result of the single subpixel,
  wherein, m is width, n is height, m:n=2:3, $\mu_1$ and $\mu_2$ are expectation values of x and y, respectively, and, $\sigma_1$ and $\sigma_2$ are standard deviations x and y, respectively, $\sigma_1$ and $\sigma_2$ are normal distribution parameters.

3. The image processing method according to claim 2, wherein step b) further comprises:
  dividing the whole plane into the grid area in which each square in the grid area corresponds to a practical pixel by using the left side practical pixel as an origin, and calculating different integral values of the left side practical pixel in different squares to determine the strengths of the subpixels of the single color;
  dividing the whole plane into a grid area in which each square in the grid area corresponds to a practical pixel by using the right side practical pixel as an origin, and calculating different integral values of the right side practical pixel in different squares to determine the strengths of the subpixels of the single color; and
  under a condition that the subpixels of the single color are all bright, selecting normal distribution parameters according to the limiting condition that the strengths of the single color of the left side practical pixel and the right side practical pixel are equal.

4. The image processing method according to claim 3, wherein the strength of the single color of the left side practical pixel is obtained by stacking the strengths of the subpixels of the single color in different squares, having an effect on the left side practical pixel, according to different integral values; and
  the strength of the single color of the right side practical pixel is obtained by stacking the strengths of the subpixels of the single color in different squares, having an effect on the right side practical pixel, according to different integral values.

5. The image processing method according to claim 4, wherein step c) further comprises:
  c1) establishing a red subpixel array, which contains a repeating group composed of the left side practical pixel and the right side practical pixel;
  c2) according to the selected normal distribution parameters, calculating the integral values of the left side practical pixel and the right side practical pixel in different squares to obtain different weight coefficients of the left side practical pixel and the right side practical pixel in different square positions;
  c3) stacking the strengths of the red subpixels in different square positions, having an effect on the left side practical pixel, according to different weight coefficients to obtain the strength of the red color of the left side practical pixel, and stacking the strengths of the red subpixels in different square positions, having an effect on the right side practical pixel, according to different weight coefficients to obtain the strength of the red color of the right side practical pixel;
  c4) establishing a blue subpixel array, which contains a repeating group composed of the left side practical pixel and the right side practical pixel;
  c5) according to the selected normal distribution parameters, calculating the integral values of the left side practical pixel and the right side practical pixel in different squares to obtain different weight coefficients of the left side practical pixel and the right side practical pixel in different square positions;
  c6) stacking the strengths of the blue subpixels in different square positions, having an effect on the left side practical pixel, according to different weight coefficients to obtain the strength of the blue color of the left side practical pixel, and stacking the strengths of the blue subpixels in different square positions, having an effect on the right side practical pixel, according to different weight coefficients to obtain the strength of the blue color of the right side practical pixel;
  c7) establishing a green subpixel array, which contains a repeating group composed of the left side practical pixel and the right side practical pixel;
  c8) according to the selected normal distribution parameters, calculating the integral values of the left side practical pixel and the right side practical pixel in different squares to obtain different weight coefficients of the left side practical pixel and the right side practical pixel in different square positions; and
  c9) stacking the strengths of the green subpixels in different square positions, having an effect on the left side practical pixel, according to different weight coefficients to obtain the strength of the green color of the left side practical pixel, and stacking the strengths of the green subpixels in different square positions, having an effect on the right side practical pixel, according to different weight coefficients to obtain the strength of the green color of the right side practical pixel.

6. The image processing method according to claim 5, wherein step d) further comprises:
  placing red strength, blue strength and green strength of the left side practical pixel into a pixel to obtain the left side virtual pixel; and
  placing red strength, blue strength and green strength of the right side practical pixel into a pixel to obtain the right side virtual pixel.

7. The image processing method according to claim 6, wherein step d) further comprises constituting the obtained virtual pixels into a virtual signal.

8. The image processing method according to claim 7, wherein the normal distribution parameters are equal to 100.

9. The image processing method according to claim 8, wherein m is equal to 10, and n is equal to 15.

* * * * *